(12) United States Patent
Garcin et al.

(10) Patent No.: US 6,309,577 B1
(45) Date of Patent: Oct. 30, 2001

(54) PROCESS FOR CASTING AND WATERPROOFING OF ELEMENTS CAST IN CONCRETE, MORTAR, CEMENT, BY USING A SILICONE RESIN

(75) Inventors: Eric Garcin, Neuilly; Sandrine Goubet, Lyons, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/142,676

(22) PCT Filed: Mar. 12, 1997

(86) PCT No.: PCT/FR97/00432

§ 371 Date: Jan. 11, 1999

§ 102(e) Date: Jan. 11, 1999

(87) PCT Pub. No.: WO97/34749

PCT Pub. Date: Sep. 25, 1997

(30) Foreign Application Priority Data

Mar. 15, 1996 (FR) .................................................. 96 03551

(51) Int. Cl.⁷ ............................. B28B 7/38; B29C 33/64; C04B 41/64
(52) U.S. Cl. .......................... 264/256; 106/2; 106/38.22; 106/287.13; 106/287.14; 106/287.15; 106/287.16; 264/333; 264/338
(58) Field of Search ...................................... 264/256, 333, 264/338; 106/38.22, 2, 287.13, 287.14, 287.15, 287.16; 528/13, 18, 33

(56) References Cited

U.S. PATENT DOCUMENTS

| | | | |
|---|---|---|---|
| 3,941,864 | * 3/1976 | Bosch et al. | 264/256 |
| 5,037,873 | * 8/1991 | Heaton . | |
| 5,051,129 | * 9/1991 | Cuthbert et al. | 106/2 |
| 5,074,912 | * 12/1991 | Liles et al. | 106/2 |
| 5,110,684 | * 5/1992 | Cooper . | |
| 5,344,906 | * 9/1994 | Westall . | |
| 5,449,716 | * 9/1995 | Liles et al. . | |
| 5,695,551 | * 12/1997 | Buckingham et al. | 106/2 |

* cited by examiner

*Primary Examiner*—Mathieu D. Vargot
(74) *Attorney, Agent, or Firm*—Jean-Louis Seugnet

(57) ABSTRACT

The process for simultaneously molding and rendering water-repellent molded components made of concrete, mortar, cement or the like consists, before pouring the concrete, cement or the like, in covering the interior of the mold with a composition comprising a resin which is a silicone copolymer in the absence of crosslinking agent of hydrolysable silane type and of curing catalyst in the composition. Molded component thus obtained and compositions for removing from the mold and rendering water-repellent.

21 Claims, No Drawings

PROCESS FOR CASTING AND WATERPROOFING OF ELEMENTS CAST IN CONCRETE, MORTAR, CEMENT, BY USING A SILICONE RESIN

This application is an application under 35 U.S.C. Section 371 of International Application Number PCT/FR97/00432 filed on Mar. 12, 1997.

The present invention relates to a process for moulding and rendering water-repellent building materials, such as moulded components made of concrete, mortar, cement or terracotta, for example tiles or bricks. Another subject-matter of the invention is the moulded objects thus obtained, as well as compositions for removing from the mould and rendering water-repellent.

Modern structures very often make use of moulded components made of concrete or mortar. These components can be moulded on site or prefabricated in specialized plants, with or without heating the item in an oven in order to accelerate its drying.

In order to facilitate removal from the mould and to minimize the defects which these items can contain, the moulds generally have a wash applied to them comprising a substance called a mould-release agent. Good removal from the mould is particularly important because it avoids the cost of correcting the defects, a cost which can reach up to 15% of the cost of the building shell. The mould-release agents are generally mineral oils, whereas the moulds are generally made of steel, of wood or of plastic. Silicone resins are rarely used because of their high cost.

Once put in place, in particular when they constitute building facades, these items are generally protected from the damage caused by moisture (rain, mist, and the like) by a water-repellent treatment. This operation of rendering water-repellent is expensive because of the manpower cost and the scaffolding cost.

Provision has already been made in the past for compositions given as facilitating removal from the mould and, at the same time, rendering water-repellent the items thus moulded. This relates to Patent Application FR-A-2,231,488, which provides for the application, to the surfaces of the moulds, of a mixture composed of water-repellent curable organosilicon compounds, finely divided solid inorganic matter and, optionally, solvents. Repeating the examples of this application has made it possible to obtain satisfactory water-repellency of the moulded product but has not made it possible to obtain good removal from the mould, the surface of the moulded item exhibiting pits as well as numerous off-white blemishes.

Patent Application FR-A-2,474,518 also discloses a composition based on silicone resins which can be crosslinked at ambient temperature in the presence of moisture, making it possible to obtain a non-stick water-repellent film which is easy to detach and which is resistant to staining. This composition can be used in a great many applications, for example as coating agent for separation or removal from the mould or as agent for coating the surface of materials to be protected from the light, from air, from water, and the like. It can be applied in particular to cement, concrete, brick, tile and slate, as well as to structures such as bridges and buildings. However, this document does not provide for simultaneously removing from the mould and rendering water-repellent moulded building components.

In addition, as regards the application with which the present invention is concerned, the composition according to this document cannot be applied on a large scale for reasons of cost. This is because this complex composition is composed of a mixture
a) of an organopolysiloxane resin,
b) of an $\alpha,\omega$-dihydroxydiorganopolysiloxane,
c) of a crosslinking agent based on an organosilane containing hydrolysable functional group(s) or its partial condensation and/or hydrolysis product, which is used to cure the composition at ambient temperature.

In addition, a curing catalyst can also be provided.

The object of the present invention is to provide a novel process which makes it possible simultaneously to removal from the mould and to render water-repellent moulded components made of concrete, mortar, cement and the like, which makes it possible both faultlessly to remove the moulded components from the mould and to render them water-repellent under conditions which are entirely satisfactory, while observing the economic criteria which have to be observed in this type of activity.

More specifically, the object of the invention is to render economically acceptable the use of silicone resins for removing building components from the mould by providing a simple composition which provides fully for both removal from the mould and for rendering water-repellent.

These objects are achieved in accordance with the invention by a process based very carefully on the ability of concrete, mortar, cement and the like, by their alkaline nature, to themselves provide for the curing of the silicone resin according to the invention.

The subject-matter of the present invention is thus a process for simultaneously moulding and rendering water-repellent moulded components made of concrete, mortar, cement or the like, characterized in that, before pouring the concrete, mortar, cement or the like, the interior of the mould is covered with a composition comprising a resin which is a silicone copolymer of following formula (I):

$$M_\alpha D_\beta T_\gamma Q_\delta (OR)_\epsilon \qquad (I)$$

where:

$M = R^1 R^2 R^3 SiO_{1/2}$ $D = R^4 R^5 SiO_{2/2}$ $T = R^6 SiO_{3/2}$ $Q = SiO_{4/2}$ $R^1$, $R^2$, $R^3$, $R^4$, $R^5$ and $R^6$, which are identical to or different from one another, each represent a $C_1$–$C_{12}$ and more particularly a $C_1$–$C_8$ hydrocarbon-comprising residue;

R is a hydrogen atom or a linear or branched $C_1$–$C_4$ alkyl radical;

the copolymer exhibits, in its structure, at least one T or Q unit;

the $\alpha$, $\beta$, $\gamma$ and $\delta$ symbols represent the molar fractions (or the proportion by number) of the silicon atoms respectively of M, D, T and Q types for one silicon atom; the $\epsilon$ symbol represents the molar fraction (or the propor tion by number) of the ≡SiOR ends per silicon atom; these symbols varying within the following ranges:

α: 0–0.5
β: 0–0.95
γ: 0–0.9
δ: 0–0.8
ε: 0.05–2 with α+β+γ+δ=1 in the absence of crosslinking agent of hydrolysable silane type and of curing catalyst in the composition.

The M units, when there are several of them, can be identical to or different from one another; the same comment also applies to the D and T units.

According to a preferred embodiment of the invention, the resin is a copolymer of formula (I) where:

$R^1$ to $R^6$, which are identical to or different from one another, each represent a linear or branched $C_1$–$C_8$ alkyl radical;

the copolymer exhibits, in its structure, at least one T unit, the δ symbol then being a number other than zero;

at least 25% by number of one or more of the $R^1$ to $R^6$ substituents represent a linear or branched $C_3$–$C_8$ alkyl radical.

More preferably, the copolymer is of type:

where:

$R^4$ to $R^6$, which are identical to or different from one another, each represent a linear or branched $C_1$–$C_8$ alkyl radical;

at least 25% by number of one or more of the $R^4$ to $R^6$ substituents represent a linear or branched $C_3$–$C_8$ alkyl radical;

β: 0.2–0.9
γ: 0.1–0.8
ε: 0.2–1.5.

More preferably still, the copolymer is of type:

where:

$R^4$ and $R^5$, which are identical to or different from one another, each represent a linear or branched $C_1$–$C_2$ alkyl radical;

$R^6$, which are identical to or different from one another, each represent a linear or branched $C_3$–$C_8$ alkyl radical;

R is a hydrogen atom or a linear $C_1$–$C_3$ alkyl radical;

β: 0.2–0.6
γ: 0.4–0.8
ε: 0.3–1.0.

Generally, each of the $R^1$ to $R^6$ radicals can be a linear or branched alkyl radical, for example methyl, ethyl, propyl, butyl or isobutyl; and alkenyl radical, such as, for example, vinyl; an aryl radical, for example phenyl or naphthyl; an arylalkyl radical, such as, for example, benzyl or phenylethyl; an alkylaryl radical, such as, for example, tolyl or xylyl; or an araryl radical, such as biphenylyl.

The silicone copolymer according to the invention is sufficient by itself to provide simultaneously for the faultless removal from the mould of the moulded components and for rendering them water-repellent. It meets the objectives set out above and renders unnecessary a subsequent water-repellency treatment.

However, one or more surface-tension modifiers can be added to it in order to improve, if need be, the spreading of the composition over the mould and the cohesion between the resin and the concrete. The following in particular can be added to it: one or more reactive or unreactive polydiorganosiloxane oils, one or more other copolymers known per se, and/or one or more conventional mould-release agents.

α,ω-Trimethylsilyl polydimethylsiloxanes with a viscosity of between 10 and 10,000 mPa.s, preferably between 50 and 5000 mPa.s, are highly suitable as unreactive oils and α,ω-dihydroxylated polydimethylsiloxanes having the same viscosities as above are highly suitable as reactive oils. These oils can be present in a proportion of 1 to 80%, in particular 1 to 60%, preferably of 40 to 60%, by weight with respect to the silicone resin (I)+oil combination.

Mention may in particular be made, as copolymers, of silicone-polyether copolymers resulting from the reaction of a polyether of formula:

with a silicone oil of formula:

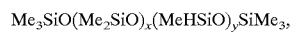

Me=methyl with v and w other than 0 and in particular between 5 and 30 with x ranging from 20 to 150 with y ranging from 2 to 10.

The copolymer can have added to it an additive, such as a free polyether, for example in a proportion by weight ranging from 40/60 to 60/40, preferably of the order of 50/50.

These copolymers can be present in a proportion of 0.1 to 10%, in particular of 0.5 to 5%, preferably of 0.5 to 2%, by weight with respect to the silicone resin (I)+copolymer combination.

It is also possible to add, to the resin, one or more conventional mould-release agents which will make it possible to decrease the amount of resin and thus the cost while, of course, providing for the mould-release criteria, the water-repellency furthermore still being provided for. These agents can be present in a proportion of 1 to 80%, in particular of 1 to 60%, preferably of 40 to 60%, by weight with respect to the silicone resin (I)+conventional mould-release agent combination.

The composition according to the invention is generally applied to the mould in a proportion of 5 to 30 g/m², in particular of 15 to 25 g/m², preferably of the order of 20 g/m².

The starting alkoxylated polyorganosiloxane resin can be obtained in a way known per se by reacting haloalkylsilanes with one another (for example cohydrolysis/alcoholysis of methyl- and propylchlorosilanes). In practice, the synthetic reaction mixture is aqueous. It comprises alcohol, for example methanol in order to obtain R=methyl, ethanol in order to obtain R=ethyl, and the like.

A further subject-matter of the present invention is the compositions for simultaneously removing from the mould and rendering water-repellent which comprise at least one resin which is a copolymer of formula (I) as defined above and at least one surface-tension modifier, chosen in particular form the group of reactive oils, unreactive oils, copolymers and mould-release agents described above.

It relates very particularly to a composition combining the resins according to the invention with at least one mould-release agent.

The present invention will now be described in more detail using embodiments given solely by way of non-limiting examples.

EXAMPLE 1

Method of Preparation of a DTOR Resin with $R=CH_3$

Reaction method: cohydrolysis/methanolysis of chlorosilanes.

32.62 mol of dimethyldichlorosilane and 32.62 mol of propyltrichlorosilane are charged to a 25 liter reactor. A methanol/water mixture, i.e. 195.6 mol of methanol and 21.77 mol of water, is run in over 3 hours and 15 minutes with stirring. The temperature is maintained at 25° C. The mixture is brought to boiling point after the methanol/water mixture has been run in and is maintained for 4 hours and 30 minutes. The reaction mixture is subsequently allowed to separate by settling for one hour and the upper phase, which represents approximately 6% of the resin, is removed. The residual chlorines are removed by readding methanol, successively 1.7, 1.5 and 1.5 kg, removed by distillation. Neutralization is carried out with 0.23 kg of sodium bicarbonate for half an hour at 40° C. 4.9 kg and 4.4 kg after filtration are obtained.

This resin has a viscosity $\eta$ at 25° C. of 27.9 mPa.s and the $^{29}$Si NMR analysis reveals the following distribution of the various units:

| Units | molar % |
|---|---|
| D (OMe) | 0.25 |
| D (OMe)$_2$ | 7.70 |
| D | 36.21 |
| T (OMe)$_3$ | 0.18 |
| T (OMe)$_2$ | 6.04 |
| T (OMe) | 26.51 |
| T | 23.11 |
| MeOSi/Si = 0.548 mol/mol | 100.00 |

Amount employed: 2728 g, i.e. 7.37 mol.

In the same way, the preparation is carried out of DTOR resins with R=linear $C_1$–$C_8$, in particular $C_1$–$C_3$, alkyl and more particularly $C_2H_5$, in accordance with the preferred embodiments of the invention. In order to obtain $R=C_2H_5$, the preparation is carried out with ethanol instead of methanol.

EXAMPLE 2

Method of Preparation of a DT(OR) Resin with $R=C_2H_5$

Reaction method: cohydrolysis/methanolysis of chlorosilanes.

3.5 mol of dimethyldichlorosilane and 3.5 mol of propyltrichlorosilane are charged to a 2 liter reactor. The temperature is brought to 60° C. and then an ethanol/water mixture (6.12 mol of ethanol/6.6 mol of water) is run in over 2 hours with stirring and heating to 80° C. The acidic ethanol is subsequently removed by distillation at 120° C. for 1 h 50 min.

The residual chlorines are subsequently removed by washing with 166 g of ethanol and 5.7 g of water (in order to adjust to the desired viscosity) and then distillation is carried out at 120° C. for 1 h 05 min. The mixture is cooled to 100° C. and neutralized with sodium bicarbonate (11.1 g) at 100° C. for 1 h. 515 g of resin are obtained after cooling to 50° C. and filtering.

This resin has a kinematic viscosity of 87.7 mm$^2$/s at 25° C.

The $^{29}$Si NMR analysis reveals the distribution given below of the various units:

| Units | Molar % relative to Si |
|---|---|
| D (OR) | 2.60 |
| D | 37.10 |
| T (OR)$_2$ | 5.80 |
| T (OR) | 23.90 |
| T | 30.60 |

Number of Si(OR) units per Si atom=0.381
Formula of the DT(OR) resin:

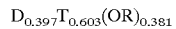

with $D=(CH_3)_2SiO_{2/2}$ and $T=C_3H_7SiO_{3/2}$

This resin will be known as resin A in the continuation of the description.

EXAMPLE 3

Tests

1) Procedure for the preparation of the mortar
Equipment
  Leroy-Somer kneader of the LS80L1 type used at its maximum speed.
  Mould made of stainless steel with dimensions of 4×4×16 cm
  Spatula
  Brush
Products
  450 g of Vicat CPA 50 cement
  225 g of water
  a bag of CEN standardized sand
Method
  The moulds have a wash applied to them beforehand using the brush.
  The cement is introduced into the bowl of the kneader, the water is poured in and mixing is carried out immediately for 30 sec. The sand is added and mixing is carried out for a further 1 min 30. The kneader is halted for 1 min and then the kneading is resumed for 2 min. The mixture is subsequently poured into the mould, packed down and levelled flat using a spatula.
  After drying for 24 hours in the mould, the test specimens are removed from the mould and dried for 8 days at 23° C. and 65% humidity.

2) Procedure for evaluating the water-repellent power

The water-repellent power of the various products is evaluated by a water uptake test by capillary attraction at 23° C. and an atmosphere with 65% humidity. The lower face of the concrete test specimens is placed in water so that the lower surface is immersed in 3 mm of water for 8 days, after which the amount of water absorbed is determined by weighing.

3) Evaluation of the removal from the mould

The removal from the mould is evaluated by taking into account various parameters, such as the ease of the removal from the mould (cohesive force of the mould with respect to the test specimen) or the appearance of the test specimens: bubbles, blemishes.

A grade of between 0 and 10 (10=faultless removal from the mould: easy, and smooth and unblemished test specimen) is then given to each test.

4) Products tested

Test 1: untreated control

Tests 2 and 3: commercial mould-release agents, sold respectively under the names Démoulux MSF® (Test 2) or Démoulux S3® (Test 3) by the company CIA, France.

Tests 4 and 5: Examples 1 and 2 of Patent Application FR-A-2,231,488.

Tests according to the invention:

Test 6: resin A (prepared in Example 2)
  Resin recorded as DTOR with R=$C_2H_5$;

Test 7: 50% resin A+50% oil B
  Oil B: polydimethylsiloxane oil blocked at each of the ends of the chains by trimethylsiloxyl units having a viscosity of 300 mPa.s at 25° C. and having an $\overline{M}_n$=8300 (it comprises approximately 110 dimethylsiloxyl units);

Test 8: 50% resin A+50% oil C
  oil C: α,ω-dihydroxypolydimethylsiloxane having a viscosity of 3500 mPa.s at 25° C., having an $\overline{M}_n$=26,150 (it comprises approximately 350 dimethylsiloxyl units) and containing 0.13% by weight of hydroxyl groups (i.e. 0.0076 SiOH units per 100 g of oil);

Test 9: 99% resin A+1% oil D
  oil D=50/50 by weight mixture of a polymer containing silicone-polyether blocks and of free polyether; the silicone-polyether polymer results from the reaction of a polyether of formula:

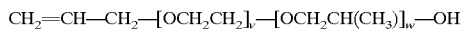

with a silicone oil of formula:

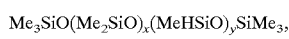

Me=methyl
with v=22 (ethylene oxide)
with w=24 (propylene oxide)
with x=73
with y=7.

5) Results

The results are collated in the table below.

| Test No. | Absorption of water after 8 days | Removal from the mould/10 |
| --- | --- | --- |
| 1 | 6.9% | 5 |
| 2 | 6.7% | 7 |
| 3 | 6.9% | 9 |
| 4 | 1.46% | 1 |
| 5 | 0.75% | 0 |
| 6 | 0.67% | 8 |
| 7 | 0.69% | 8 |
| 8 | 0.63% | 7 |
| 9 | 0.95% | 10 |

6) Conclusions

Commercial products (Tests 2 and 3) give satisfactory removal from the mould but are entirely without water repellency.

The products claimed in Patent FR 2,231,488 (Tests 4 and 5) give good water-repellent properties but are very bad mould-release agents.

The products according to the invention (Tests 6 to 9) have good to very good mould-releasing properties and an excellent water-repellent power.

EXAMPLE 4

Test

1) Procedure for preparation of the mortar

Equipment
  Euromachine kneader of the M201 type used at a speed of 195 rev/min.
  Mould made of stainless steel with dimensions of 40×25×5 cm Products
  900 g of Vicat CPA 50 cement
  450 g of water
  2 bags of CEN standardized sand Method The product is applied beforehand to the mould using a rag.

The cement is introduced into the bowl of the kneader, the water is poured in and mixing is carried out immediately for 30 sec. The sand is added and mixing is carried out for a further 1 min. The kneader is halted for 1 min 30 and then the kneading is resumed for 1 min. The mixture is subsequently poured into the mould and vibrated for 2 min.

After drying for 24 hours in the mould, the slabs are removed from the mould and are dried for 8 days exposed to the surrounding atmosphere.

2) Procedure for evaluating the water-repellent power

The water-repellent power of the various products is evaluated by a water uptake test with a Karsten tube, a test carried out according to the directions of the RILEM standard No. II.4 of 1978 (RILEM=Réunion Internationale des Laboratoires d'Essais et de Recherches sur les Matériaux et les Constructions [International Union of Laboratories for Tests and Research on Materials and Structures]). The volume of water absorbed by the slab over a time of 4 hours is measured.

3) Evaluation of the removal from the mould

The removal from the mould is evaluated by taking into account various parameters, such as the ease of the removal from the mould (cohesive force of the mould to the slab) or the appearance of the slabs: bubbles, blemishes.

A grade of between 0 and 10 (10=faultless removal from the mould: easy, and smooth and unblemished slab) is then given to each test.

4) Products tested

Test 1: untreated control.

Test 2: commercial mould-release agent sold under the name Estorob 804-01® by the company Novance, France.

Tests according to the invention:

Test 3: resin A (prepared in Example 2) Resin recorded as DTOR with R=$C_2H_5$;

Test 4: 50% resin A+50% Estorob 804-01®.

5) Results

The results are collated in the table below.

| Test No. | Absorption of water after 4 hours | Removal from the mould/10 |
|---|---|---|
| 1 | 5 ml | 5 |
| 2 | 4 ml | 9 |
| 3 | 0.05 ml | 8 |
| 4 | 0.05 ml | 9 |

6) Conclusions

The commercial product gives satisfactory removal from the mould but does not introduce a water-repellent property.

The products according to the invention (Tests 3 and 4) have good mould-release properties as well as an excellent water-repellent power.

What is claimed is:

1. A process for simultaneously moulding in a mould having an interior and rendering water-repellent moulded components made of concrete, mortar, or cement comprising the steps of:

covering the interior of the mould before pouring the concrete, mortar, or cement, with a composition comprising a resin which is a silicone copolymer of following formula (I):

$$M_\alpha D_\beta T_\gamma Q_\delta (OR)_\epsilon \quad (I)$$

wherein $M = R^1 R^2 R^3 SiO_{1/2}$ $D = R^4 R^5 SiO_{2/2}$ $T = R^6 SiO_{3/2}$ $Q = SiO_{4/2}$ $R^1$, $R^2$, $R^3$, $R^4$, $R^5$ and $R^6$, which are identical to or different from one another, each represent a $C_1$–$C_{12}$ hydrocarbon-comprising residue;

R is a hydrogen atom or a linear or branched $C_1$–$C_4$ alkyl radical;

the $\alpha$, $\beta$, $\gamma$ and $\delta$ symbols represent the molar fractions (or the proportion by number) of the silicon atoms respectively of M, D, T and Q types for one silicon atom; the $\epsilon$ symbol represents the molar fraction (or the proportion by number) of the $(-)_3SiOR$ ends per silicon atom; these symbols varying within the following ranges:

$\alpha$: 0–0.5

$\beta$: 0–0.95

$\gamma$: 0–0.9

$\delta$: 0–0.8

$\epsilon$: 0.05–2 with the proviso that $\alpha+\beta+\gamma+\delta=1$, and that the copolymer exhibits, in its structure, at least one T or Q unit; and in the absence of crosslinking agent of hydrolysable silane and of curing catalyst in the composition.

2. A process according to claim 1, wherein the resin is a copolymer of formula (I) wherein:

$R^1$ to $R^6$, which are identical to or different from one another, each represents a linear or branched $C_1$–$C_8$ alkyl radical;

with the proviso that the copolymer exhibits, in its structure, at least one T unit, the $\gamma$ symbol then being a number other than zero; and at least 25% by number of one or more of the $R^1$ to $R^6$ substituents represent a linear or branched $C_3$–$C_8$ alkyl radical.

3. A process according to claim 1, wherein the copolymer is of formula:

$$D_\beta T_\gamma (OR)_\epsilon$$

wherein:

$R^4$ to $R^6$, which are identical to or different from one another, each represent a linear or branched $C_1$–$C_8$ alkyl radical;

at least 25% by number of one or more of the $R^4$ to $R^6$ substituents represent a linear or branched $C_3$–$C_8$ alkyl radical; and $\beta$: 0.2–0.9

$\gamma$: 0.1–0.8

$\epsilon$: 0.2–1.5.

4. A process according to claim 1, wherein the copolymer is of formula:

$$D_\beta T_\gamma (OR)_\epsilon$$

wherein:

$R^4$ and $R^5$, which are identical to or different from one another, each represent a linear or branched $C_1$–$C_2$ alkyl radical;

$R^6$, which are identical to or different from one another, each represent a linear or branched $C_3$–$C_8$ alkyl radical;

R is a hydrogen atom or a linear $C_1$–$C_3$ alkyl radical; and $\beta$: 0.2–0.6

$\gamma$: 0.4–0.8

$\epsilon$: 0.3–1.0.

5. A process according to claim 1, wherein the $R^1$ to $R^6$ radicals are methyl, ethyl, propyl, butyl, isobutyl, vinyl, phenyl, naphthyl, benzyl, phenylethyl, tolyl, xylyl, or biphenylyl.

6. A process according to claim 1, wherein the composition further comprises one or more surface-tension modifiers.

7. A process according to claim 1, wherein the composition further comprises one or more reactive or unreactive polydiorganosiloxane oils.

8. A process according to claim 7, wherein the oils are $\alpha,\omega$-trimethylsilyl polydimethylsiloxane oils with a viscosity of between 10 and 10,000 mPa.s.

9. A process according to claim 7, wherein the oils are $\alpha,\omega$-dihydroxylated polydimethylsiloxane oils with a viscosity of between 10 and 10,000 mPa.s.

10. A process according to claim 7, wherein the oils are present in a proportion of 1 to 80% by weight with respect to the weight of the silicone resin (I) and of the oil.

11. A process according to claim 10, wherein the oils are present in a proportion of 1 to 60% by weight.

12. A process according to claim 1, wherein the composition further comprises one or more silicone-polyether copolymers resulting from the reaction of a polyether of formula:

$$CH_2=CH-CH_2-[OCH_2CH_2]_v-[OCH_2CH(CH_3)]_w-OH$$

with a silicone oil of formula:

$$Me_3SiO(Me_2SiO)_x(MeHSiO)_ySiMe_3,$$

Me=methyl with v and w other than 0;

with x ranging from 20 to 150;

with y ranging from 2 to 10; and optionally in the presence of a free polyether additive.

13. A process according to claim 12, wherein v and w are between 5 and 30.

14. A process according to claim 13, wherein the copolymer is present in a proportion of 0.1 to 10% by weight with respect to the weight of the silicone resin (I) and of the copolymer.

15. A process according to claim 14, wherein the copolymer is present in a proportion of 0.5 to 5% by weight.

16. A process according to claim 1, wherein the composition further comprises one or more mould-release agents.

17. A process according to claim 16, wherein the mould-release agent is present in a proportion of 1 to 80% by weight with respect to the weight of the silicone resin (I) and of the mould-release agent.

18. A process according to claim 17, wherein the mould-release agent is present in a proportion of 1 to 60% by weight.

19. A process according to claim 1, wherein the composition is applied to the mould in a proportion of 5 to 30 g/m².

20. A process according to claim 19, wherein the composition is applied to the mould in a proportion of 15 to 25 g/m².

21. A moulding and water-repellent composition, comprising at least one resin which is a silicone copolymer of formula (I):

$$M_\alpha T_\beta T_\gamma Q_\delta (OR)_\epsilon \qquad (I)$$

wherein:

$M=R^1R^2R^3SiO_{1/2}$ $D=R^4R^5SiO_{2/2}$ $T=R^6SiO_{3/2}$ $Q=SiO_{4/2}$;

$R^1$, $R^2$, $R^3$, $R^4$, $R^5$ and $R^6$, which are identical to or different from one another, each represent a $C_1$–$C_{12}$ hydrocarbon-comprising residue;

R is a hydrogen atom or a linear or branched $C_1$–$C_4$ alkyl radical;

the $\alpha$, $\beta$, $\gamma$ and $\delta$ symbols represent the molar fractions (or the proportion by number) of the silicon atoms respectively of M, D, T and Q types for one silicon atom; the $\epsilon$ symbol represents the molar fraction (or the proportion by number) of the $(-)_3$ SiOR ends per silicon atom; these symbols varying within the following ranges:

α: 0–0.5

β: 0–0.95

γ: 0–0.9

δ: 0–0.8

ε: 0.05–2 with the proviso that α+β+γ+δ=1, and that the copolymer exhibits, in its structure, at least one T or Q unit; and at least one surface-tension modifier selected from the group consisting of an unreactive oil, a reactive oil, a copolymer, and a mould-release agent in the absence of crosslinking agent of hydrolysable silane and of curing catalyst in the composition.

* * * * *